United States Patent [19]

Kolesar

[11] Patent Number: 5,448,815
[45] Date of Patent: Sep. 12, 1995

[54] DUCT FLANGE ASSEMBLY APPARATUS

[75] Inventor: John R. Kolesar, West Mifflin, Pa.

[73] Assignee: Ward Industries, Inc., Pittsburgh, Pa.

[21] Appl. No.: 179,412

[22] Filed: Jan. 10, 1994

[51] Int. Cl.$^6$ ............................................. B23P 11/00
[52] U.S. Cl. ..................... 29/243.5; 29/252; 29/243.56; 29/281.5
[58] Field of Search ............... 29/525.1, 426.5, 243.5, 29/243.56, 252, 809, 464, 281.5, 818, 238, 251, 451, 525; 285/363, 368, 405, 412, 424

[56] References Cited

U.S. PATENT DOCUMENTS

| | | |
|---|---|---|
| 3,712,650 | 1/1973 | Mez . |
| 4,398,334 | 8/1983 | Kovalevich ....................... 29/243.5 |
| 4,508,376 | 4/1985 | Arnoldt . |
| 4,566,724 | 1/1986 | Arnoldt et al. . |
| 4,584,756 | 4/1986 | Arnoldt . |
| 5,054,823 | 10/1991 | Arnoldt . |
| 5,283,944 | 2/1994 | Goodhue . |

*Primary Examiner*—Robert C. Watson
*Attorney, Agent, or Firm*—Kirkpatrick & Lockhart

[57] ABSTRACT

An apparatus for inserting a leg of an L-shaped corner member into the channel of an elongated flange member used in an assembly for connecting the adjacent ends of rectangular sheet metal ducts. The apparatus, in a preferred form, comprises a base member that is adapted to receive a flange member in a receiving position. A corner positioning member is attached to the base member and is adapted to position a leg of a corner member in confronting relationship with the channel of the flange member. Insertion apparatus is attached to the positioning member for selectively inserting the positioned leg into the channel of a flange member a predetermined distance.

15 Claims, 7 Drawing Sheets

DUCT FLANGE ASSEMBLY APPARATUS

BACKGROUND OF THE INVENTION

1. Field Of the Invention

The present invention relates to assembly apparatuses and, more particularly, is directed to apparatus for inserting a leg of an L-shaped corner member into the channel of an elongated flange member used in an assembly for connecting the adjacent ends of rectangular sheet metal ducts.

2. Description of the Invention Background

In the heating, ventilation, and air conditioning industry, ducts fabricated from various types of sheet metal materials are typically used to transport conditioned air throughout homes, factories, office buildings and other structures. One could surmise that perhaps there are collectively thousands of miles of such ducts in homes and various other structures throughout the world.

Typical heating, ventilation, and air conditioning duct arrangements comprise rectangular shaped elongated sections that are fastened together at their ends to form a single duct assembly. It has been found that such "sectional" duct assembly is more structurally sound than a single non-sectional duct of similar length. In such sectional duct assemblies, the duct sections must be perfectly aligned to prevent the duct assembly from buckling and to enable airtight seals to be established and maintained between each duct section.

Over the years, a variety of different "flange-type" joint assembly arrangements have been developed for connecting the adjacent ends of rectangular sheet metal ducts together. For example, U.S. Pat. No. 3,712,650 to Mez, U.S. Pat. No. 4,288,115 to Sullivan, and U.S. Pat. No. 5,054,823 to Arnoldt disclose various flange-type duct connection arrangements for interconnecting the adjacent ends of rectangular duct sections. Such flange-type connection arrangements typically consist of a pair rectangular frames that are each constructed from four roll-formed flange members that are adapted to be attached to the edges of adjacent duct ends. The flange members typically comprise an L-shaped member that has an upstanding leg-receiving portion and a duct receiving portion extending perpendicularly therefrom. Four L-shaped corner members, each having relatively planar legs that are adapted to be inserted into the upstanding leg-receiving channels of adjacent flanges, are used to interconnect the flanges in a rectangular shape. The flanges are precut to predetermined lengths such that when assembled together into a rectangular shape, their duct receiving portions fit perfectly on the end of a corresponding duct.

During the duct assembly process, the rectangular frames are first assembled. Thereafter, each frame is inserted onto an end of a corresponding duct such that the end of the duct is forcibly received in the duct receiving portions of the flange members comprising the rectangular frame. After the rectangular frame has been inserted onto the corresponding duct end, it is typically secured to the duct by sheet metal screws, rivets, or spot welds.

After the frames have been attached to the adjacent ends of two duct sections, a gasket material is typically positioned between the frames. The frames are then bolted together in confronting relationship by bolts that extend through the L-shaped corner members. The heating, ventilation, and air conditioning industry has found that such flange-type connection arrangement serves to rigidly interconnect the adjacent ends of rectangular ducts together while maintaining a substantially airtight seal between the duct sections.

To ensure that the rectangular frame remains together after it has been assembled, the legs of the L-shaped corner members are complementary dimensioned with respect to the leg-receiving channels of the flange members such that a force or friction type fit is created between the leg and the corresponding flange member. Such force fit arrangement, however, makes assembling the rectangular frames difficult and time consuming.

In the past, the rectangular frames have been manually assembled. Such assembly operation typically involves grasping a flange member in one hand and inserting the end of a corner leg into the leg-receiving channel of the flange member. The opposite end of the flange member is then abutted against a solid surface, usually the floor, and a rubber mallet or other suitable tool is used to drive the L-shaped corner member into the flange channel. A similar corner/flange assembly is then constructed in the same manner. Thereafter, the ends of the free legs of the four corner members are inserted into the side flange members and the corner members are struck with a hammer to cause the free legs to be inserted into the corresponding channels.

The reader will appreciate that the above-described method of connecting the L-shaped corner members to their corresponding flange members is fraught with many disadvantages. In particular, such unstable method of supporting the flange member and corner assembly while it is being driven together provides an opportunity for the corner member to become dislodged from the flange member during the assembly process which could injure the individual assembling the flange/corner assembly. Also, if the flange member is not adequately supported, it, too, could strike the person constructing the assembly. It will also be appreciated that longer lengths of flange members are much more difficult to support during the assembly process. The reader will further appreciate that such manual assembly operation can damage the flange members and/or corner members as they are being driven together.

Thus, there is a need for apparatus for inserting the legs of L-shaped corner members into the channel of a corresponding flange member in a safe and efficient manner. There is a further need for an assembly apparatus that is capable of assembling corner members and flange members of different sizes and lengths.

SUMMARY OF THE INVENTION

In accordance with the particular preferred form of the present invention, there is provided an apparatus for inserting a leg of an L-shaped corner member into the channel of an elongated flange member that is used in an assembly for connecting the adjacent ends of rectangular sheet metal ducts. In a preferred form, the apparatus comprises a base member that is adapted to support the flange in a receiving position. A positioning member is attached to the base member for positioning the L-shaped corner member in an insertion position wherein a leg of the L-shaped corner member is in confronting relationship with an end of the flange member. Also attached to the base member is an insertion member for inserting the positioned leg of the L-shaped corner member into the channel member a predetermined distance.

In another preferred embodiment, a second positioning member and a second insertion member are attached to the base member such that a leg of a second L-shaped corner member may be inserted into the opposite end of the flange member. Each of the corner positioning apparatuses may also be equipped with a storage or magazine member for storing a plurality of L-shaped corner members in a ready position such that they may be sequentially advanced to an insertion position for insertion into the channel of a flange member. Also, to assist in positioning a leg of an L-shaped corner member in confronting relationship with the channel of a flange member, a registration member may be attached to the base member for raising the corner leg a predetermined height above the base member to thus align the leg with the channel such that the leg may be inserted therein.

It is an object of the present invention to provide apparatus for the safe and efficient assembly of L-shaped corner members and corresponding flange members used in assemblies for connecting the adjacent ends of sheet metal ducts.

It is a further object of the present invention to provide apparatus that can simultaneously connect an L-shaped corner member to each end of an elongated flange member.

It is a further object of the present invention to connect L-shaped corner members of various sizes to corresponding flange members of varying lengths.

It will be appreciated that the present invention provides solutions to the aforementioned problems of inserting a leg of an L-shaped corner member into the channel of a flange member. The present invention serves to safely support a flange member in a receiving position while a leg of a corresponding corner member is inserted into the flange channel. The present invention can also be used to simultaneously insert the legs of corner members into the ends of the channel that extends through a corresponding flange member. The reader will appreciate that these and other details, objects and advantages will become apparent as the following detailed description of a present preferred embodiment proceeds.

BRIEF DESCRIPTION OF THE DRAWINGS

In the accompanying drawings, there is shown present preferred embodiments of the invention wherein like reference numerals are employed to designate like parts and wherein.

DETAILED DESCRIPTION OF THE PREFERRED EMBODIMENTS

Figure 1:
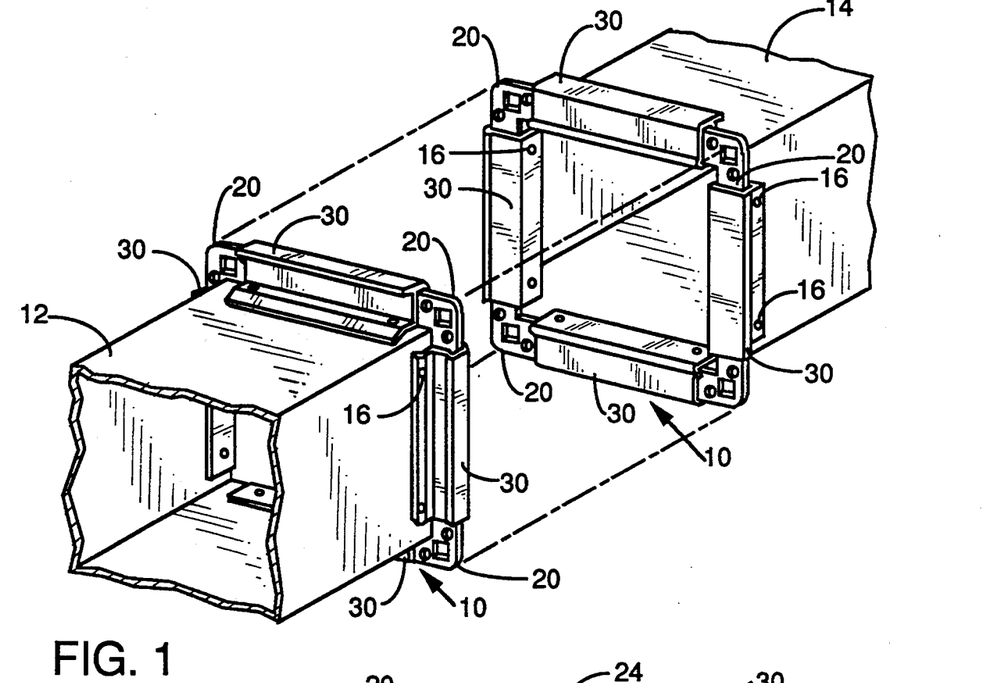
FIG. 1 is a perspective exploded assembly view of a typical duct flange assembly arrangement for connecting the adjacent ends of rectangular sheet metal ducts together.

Referring now to the drawings for the purposes of illustrating a present preferred embodiment of the invention only and not for purposes of limiting the same, FIG. 1 depicts two rectangular duct flange assemblies 10 attached to the adjacent ends of two rectangular ducts (12, 14). As can be seen from FIG. 1, the rectangular duct assemblies 10 each comprise four L-shaped corner members 20 that are inserted into four flange members 30.

Figure 3:
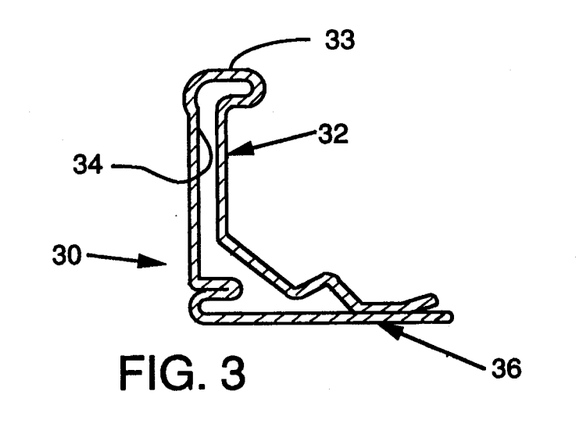
FIG. 3 is an end view of a typical flange member.

As will be discussed in further detail below, each flange member 30 is relatively L-shaped when viewed from the end and has an upstanding leg-receiving portion 32 and a duct receiving portion 36. See FIG. 3. The upstanding leg-receiving portion 32 has an end portion 33 and a leg receiving channel 34 that extends through the entire length of the upstanding leg-receiving portion 32. As can be seen in FIG. 1, after the L-shaped corner members 20 and flange members 30 are assembled into rectangular frame assemblies 10, the duct receiving portions 36 of the flanges 30 are inserted onto the ends of the adjacent ducts 12 and 14 such that the upstanding portions 32 of each flange on duct 12 are in confronting relationship with each of the upstanding portions 32 of the flanges 30 attached to duct 14. Screws 16 are then used to attached the flanges 30 to the ducts (12, 14). However, a variety of other known fastening means such as rivets or welds may be used to attach the flanges 30 to the ducts (12, 14).

After the flange assemblies 10 have been attached to the ends of the ducts (12, 14) in the manner depicted in FIG. 1, a gasket material (not shown) is typically placed between the flange assemblies 10. The flange assemblies 10 are then fastened together by bolts (not shown) that extend through bolt holes 28 (see FIG. 2) that are provided in the L-shaped corner members 20.

Figure 2:
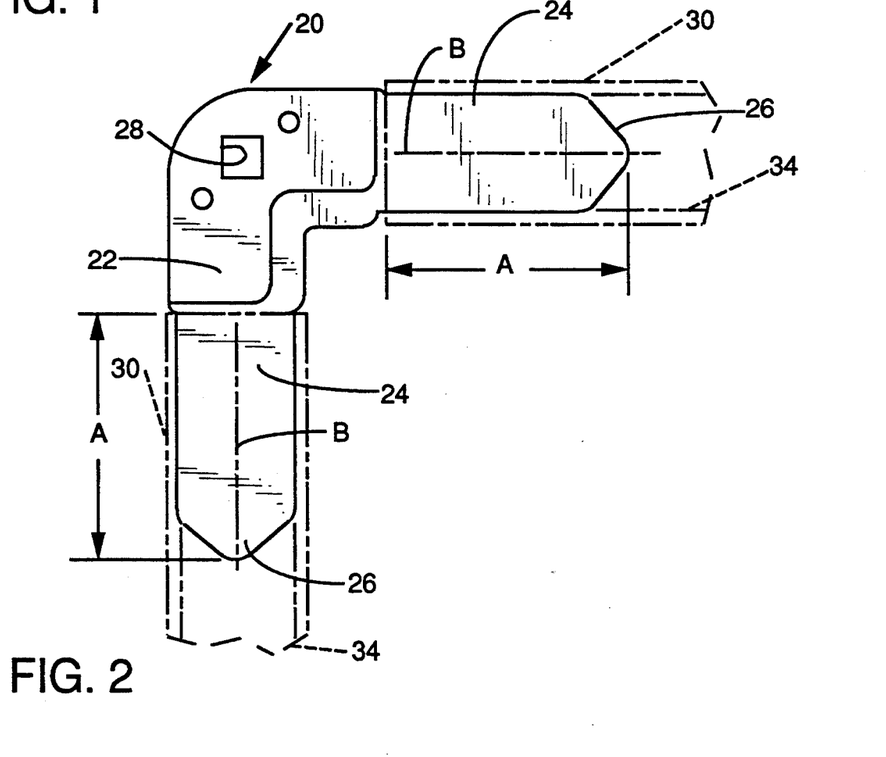
FIG. 2 is a plan view of a typical L-shaped corner member with the legs thereof inserted into the channels of corresponding flange members that are shown in phantom lines.

FIG. 2 depicts a typical L-shaped corner member 20 that has a corner portion 22 and two outwardly extending leg portions 24. Each leg portion 24 is substantially planar and terminates in a slightly pointed end portion 26 that aides in the insertion of the leg 24 into the channel 34 of a flange member 30. Leg portions 24 are complementary dimensioned with respect to the channel 34 of a flange member 30 such that a leg 24 can be inserted into a channel 34 a predetermined distance "A" (in a preferred embodiment, distance "A" is approximately 2.125") and retained therein by frictional engagement between the flange member 30 and the leg member 24. The reader will appreciate that distance "A" will vary depending upon the exact size and construction of the L-shaped corner members 20 and the flange members 30. Also, for explanatory purposes, it will be appreciated that each leg 24 has an insertion axis designated as "B" and the channel 34 of each flange member 30 similarly has an insertion axis designated as "C" such that when axes "B" and "C" are substantially vertically and horizontally aligned (i.e., substantially coaxial), the leg 24 can be inserted into the channel 34.

The foregoing discussion of the corner member 20 and flange member 30 construction and assembly was provide to give the reader an understanding of the assembly of a typical duct flange connection arrangement for connecting the adjacent ends of two rectangular ducts. The corner members and flanges discussed and depicted herein are exemplary of the type of connectors and flanges typically used in the heating, ventilation, and air conditioning industry. However the specific size, shape, and construction of the corner members and flange members should not be construed to limit the scope of the duct flange assembly apparatus of the subject invention.

Figure 4:
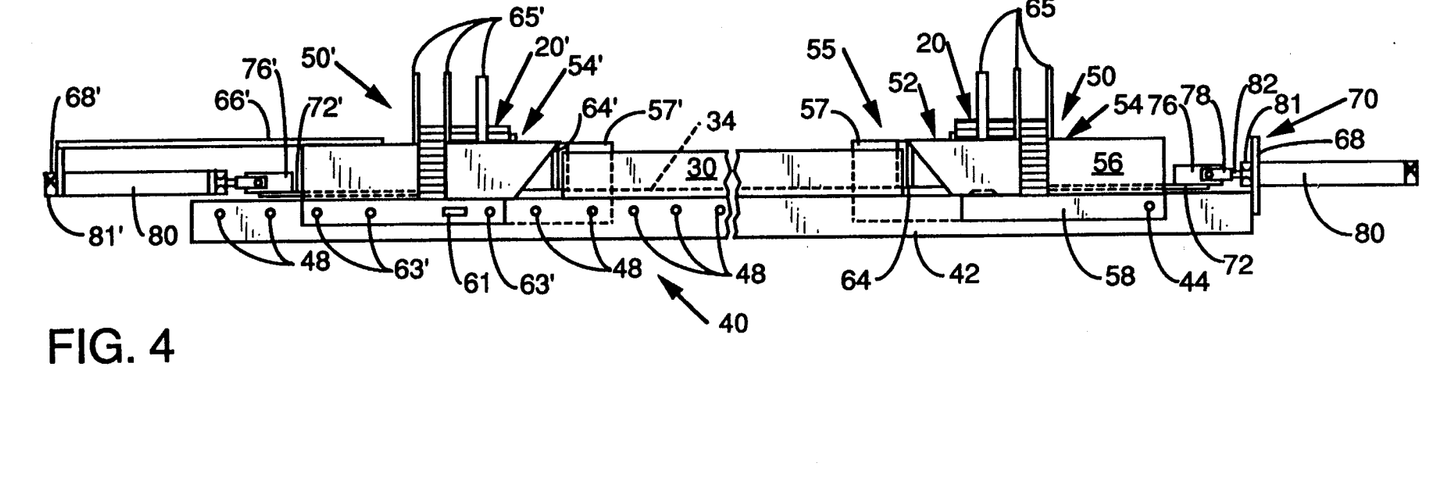
FIG. 4 is a side elevational view of the duct flange assembly apparatus of the present invention.
Figure 5:
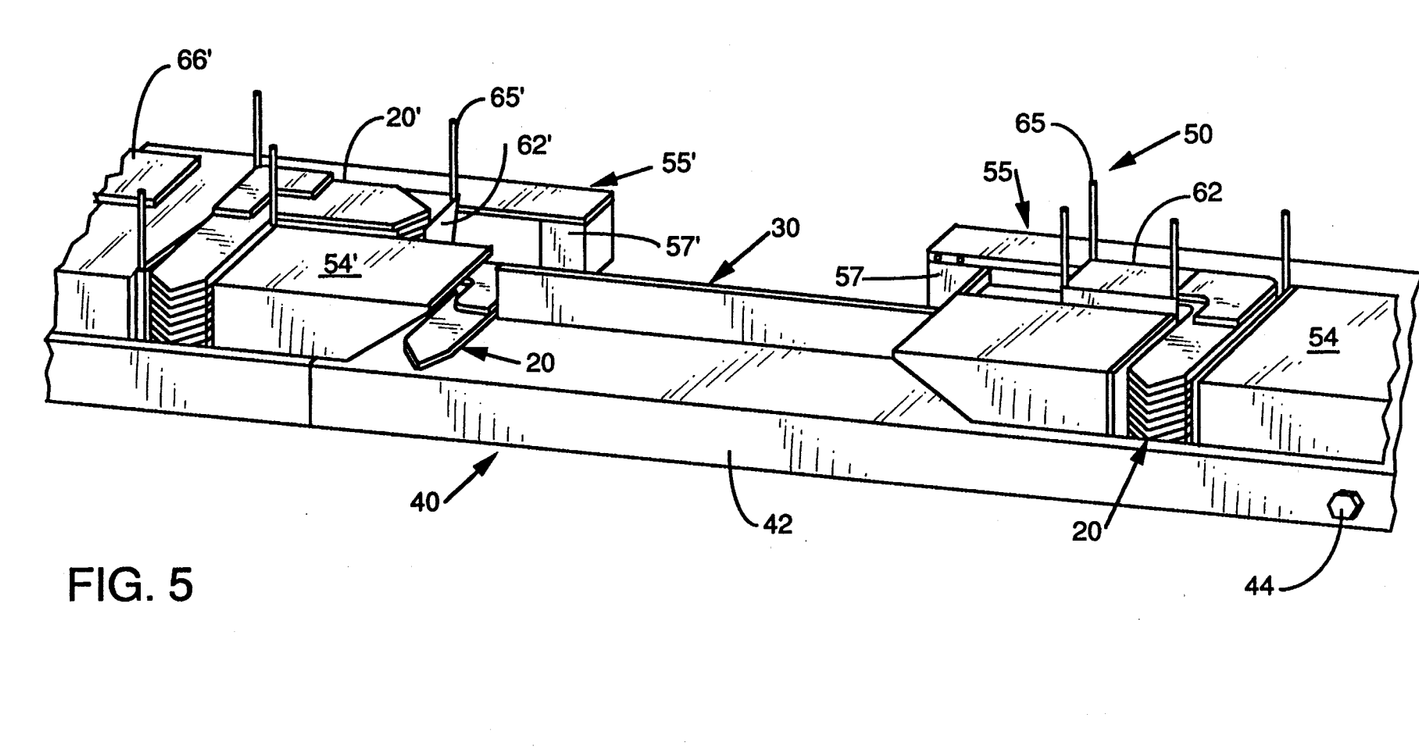
FIG. 5 is a partial perspective view of the duct flange assembly apparatus of the present invention.

More particularly and with reference to FIGS. 4 and 5, there is shown a present preferred duct flange assembly apparatus, generally designated as 40. A preferred assembly apparatus 40 comprises a base member 42 and a right corner positioning unit 50 and a left corner positioning unit 50' that are received on the base member 42. Base member 42 is preferably fabricated from 6" steel C-channel; however, the skilled artisan will readily appreciate that the base member 42 can be fabricated from a variety of other materials without departing from the spirit and scope of the present invention. Also, as will become evident as the detailed description proceeds, base member 42 may be provided in a variety of different lengths depending upon the lengths of flange members 30 that are being assembled.

Figure 6:
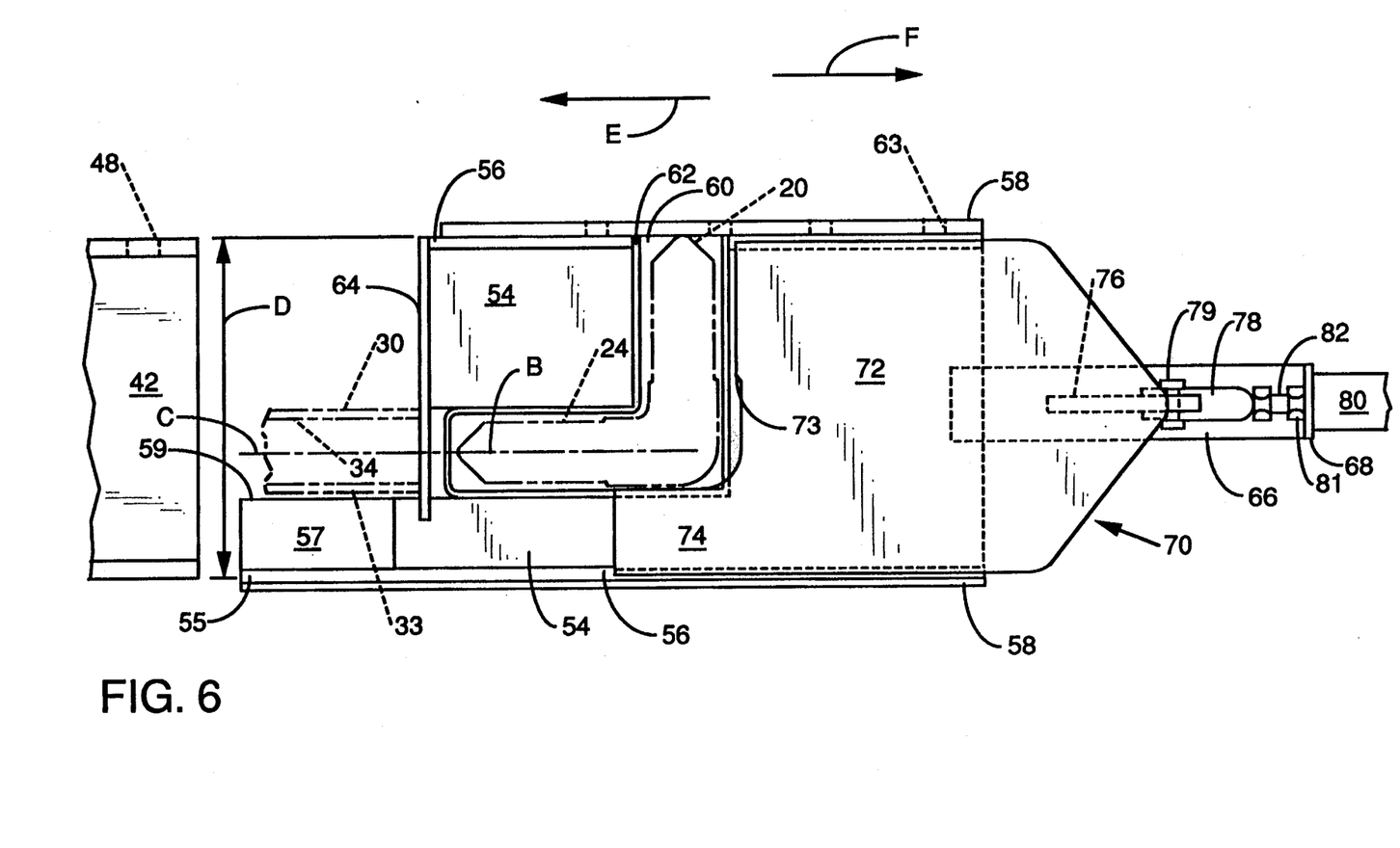
FIG. 6 is a bottom assembly view of a right corner positioning unit of the present invention removed from the base member, the bottom of which is also partially shown.

As can be seen in FIGS. 4–6, the right corner positioning unit 50 comprises a housing member 52 that is preferably fabricated from steel plate and channel members that are welded together. In particular, housing member 52 comprises a top channel member 54 that has two downwardly extending side portions 56. Attached to each side portion 56, preferably by welding, is a retaining plate 58. Retaining plates 58 are preferably adapted to slidably retain the right corner positioning assembly 50 on the base member 42. Therefore, the distance "D" (see FIG. 6) between the retaining plates 58 is slightly larger (i.e., 0.125") than the width of the base member 42.

In a preferred embodiment, a right corner-receiving cavity 60 is provided through the top channel 54. Cavity 60 is sized and shaped to freely receive a plurality of L-shaped corner members 20. In a preferred embodiment, cavity 60 is provided with a liner 62 that is fabricated from a piece of steel plate having an L-shape. The liner 62 is preferably welded to top channel 54 such that the corner members received therein are positioned for insertion into the channel 34 of a frame member 30 that has been placed in a receiving position on the base member 42. Also in a preferred embodiment, a downwardly extending end plate 64 is attached to the top channel 54, preferably by welding, in the position shown in FIG. 6.

As can also be seen in FIGS. 5 and 6, a portion 55 of the top channel 54 extends beyond end plate 64 and an orientation member 57, preferably consisting of a piece of steel bar, is welded thereto. The orientation member 57 serves to provide a surface 59 for orienting the flange member 30 in a receiving position on the base member 42 with respect to the corner members 20 positioned in the liner 62. From reference to FIG. 6, the skilled artisan will appreciate that when the end 33 of the upstanding leg portion 32 of a flange member 30 is abutted against bearing surface 59, the insertion axis "C" of the channel 34 will be horizontally aligned with the insertion axis "B" of the leg 24 of a corner member 20 received in the liner 62.

The corner members 20 are inserted into a channel 34 of a corresponding flange 30 by an insertion assembly generally designated as 70. More particularly and with reference to FIG. 6, insertion assembly 70 preferably comprises a driver plate 72 that is dimensioned to freely slide between restraining plates 58 in the directions depicted by arrows "E" and "F". Preferably, the front portion of the driver plate 72 is provided with an L-shaped portion 74 that is sized and shaped to receive an L-shaped corner member 20. In a preferred embodiment, driver plate 72 is provided with an offset area 73 to receive the offset corner portion of a corner member 20. It will be appreciated that L-shaped portion 74 in cooperation with offset area 73 serves to keep the insertion axis "B" of leg 24 substantially horizontally aligned with the insertion axis "C" of the corresponding flange member 30 as driver plate 72 drives leg 24 into the channel 34 in the insertion direction depicted by arrow "E".

Preferably, the rear end of the driver plate 72 has an attachment plate 76 weld thereto that is adapted to receive a commercially available clevis member 78. In particular, clevis member 78 is pinned to attachment plate 76 by a pin 79 in a known manner. The opposite end of clevis 78 is attached, in a known manner, to the extendable and retractable piston 82 of a cylinder 80, the operation of which will be discussed in further detail below. As can be seen in FIG. 4, a cylinder attachment plate 68 is attached to the base member 42, by bolting or welding and is attached to the front of the cylinder 80 in a known manner (i.e., by a fastening nut arrangement 81 provided on the front portion of the cylinder 80) such that the cylinder 80 is rigidly supported from the base member 42. It will be appreciated that attachment plate may also be attached to the rear of cylinder 80 by other known cylinder attachment means such as by removable pins, etc. As can also be seen in FIGS. 4 and 5, extension plates 65 may be attached to the top channel member 54, to increase the corner holding capacity of the liner 62.

In a preferred embodiment, right corner positioning unit 50 is rigidly attached to the base member 42 by a bolt 44 that extends through bores 63 provided in one of the restraining members 58 and bores 48 provided in the sides of the base 42. The skilled artisan will appreciate, however, that the right corner positioning unit 50 can be attached to the base member by a variety of other known fastening arrangements.

Figure 7:
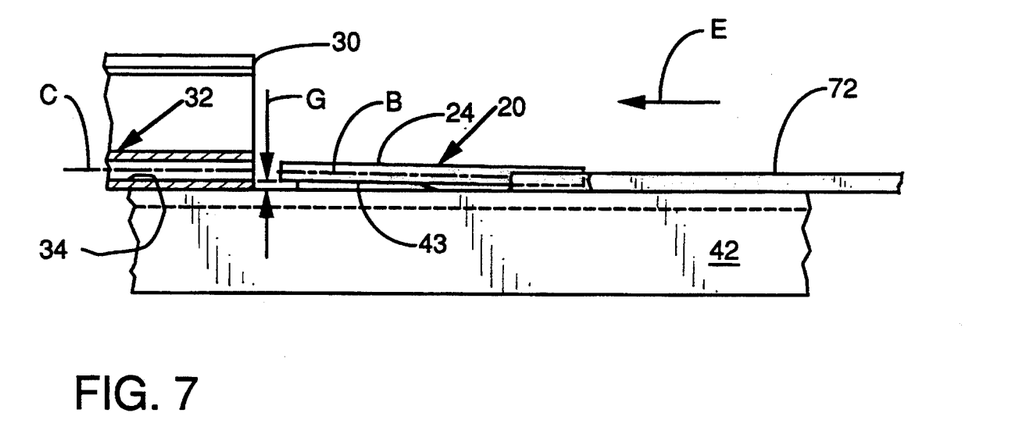
FIG. 7 is a partial side elevational view of the base member and the drive plate of a right corner positioning unit that illustrates the registration and insertion of a leg of a right corner member into the channel of a flange member shown in partial cross-section.

Also in a preferred embodiment, a right registration member 43 is attached to the base member 42 to raise the leg 24 of the L-shaped corner member 20 that is being inserted into the channel 34 of a flange member 30 a predetermined distance "G" above the base member 42 such that the insertion axis "B" of the corner member leg 24 is substantially vertically aligned with the insertion axis "C" of the channel 34. See FIG. 7. Preferably, registration member 43 has a tapered profile such that it can engage the front end 26 of the corresponding leg 24 and cause the leg 24 to be raised above the base a distance "G" to thereby vertically align the insertion axis "B" of the corresponding leg 24 with the insertion axis "C" of the channel 34 so that the leg 24 may be inserted into channel 34 by the driver plate 72. In a preferred embodiment, the registration member 43 is fabricated from a piece of tapered steel that is welded to the base member 42. Silicon spray or other lubricant may be used to reduce the friction between the leg 24 and the registration member 43. The skilled artisan will also appreciate that registration member 43 may be fabricated from self-lubricating material such as graphite impregnated steel to reduce the amount of friction between the registration member 43 and the leg 24.

In addition to the right corner positioning unit 50, a "left" corner positioning unit 50' for positioning and inserting a leg 24' of a second corner member 20' into the channel 34 at the left end of the flange member 30 may also be provided on the base member 42. From reference to FIGS. 4, 5, and 8, the skilled artisan will appreciate that, except for differences discussed below, the left corner positioning unit 50' is a "left-handed" version of the right corner positioning unit 50 and is constructed from substantially the same elements (designated by "'" in FIGS. 4, 5, 8, and 9) in substantially the same manner as the right corner positioning unit 50.

In a preferred embodiment, however, the left corner positioning unit 50' is adapted to be easily movably positioned on the base member 42 to increase or decrease the distance between the positioning units 50 and 50' to enable varying lengths of flange members to be positioned in receiving positions on the base member 42. To enable the left corner positioning unit 50' to be easily repositioned on the base member 42, a plurality of bores 63' are provided in the retaining plate 58' that are adapted to align with one of a plurality of spaced bores 48 provided in the sides of the base 42. Thus, a flange member 30 is first placed on the base in a receiving position. Thereafter, the left corner positioning member 50' is slidably positioned on the base member 42 to a point where the end plate 64' of the left corner positioning unit 50' nearly abuts the left end of the flange member 30 and a bore 63' in the retaining plate 58' aligns with a bore 48 in the base member 42. To retain the left corner positioning unit 50' in that position, a commercially available quick-release pin 61' is inserted into the aligned bores 48 and 63'. The skilled artisan will appreciate, however, that the left corner positioning unit 50' may be releasably locked in position by a number of other known "quick release" fastening arrangements without departing from the spirit and scope of the present invention. It will also be appreciated that the right corner positioning unit 50 may, in the alternative, be pinned to the base 42 in a similar manner. Yet another alternative construction may comprise both of the positioning units 50 and 50' being pinned to the base member 42.

As can also be seen in FIG. 4, cylinder 80' is attached to the left corner positioning unit 50' so that it can travel therewith. In a preferred embodiment, an attachment plate 66' is attached to the top channel 54, preferably by welding and extends to a position above the rear portion of cylinder 80'. A second attachment plate 68' is attached to plate 66' and is connected to the rear of cylinder 80' by known fastening means such as a securing nut 81' or a pin (not shown).

Figure 8:
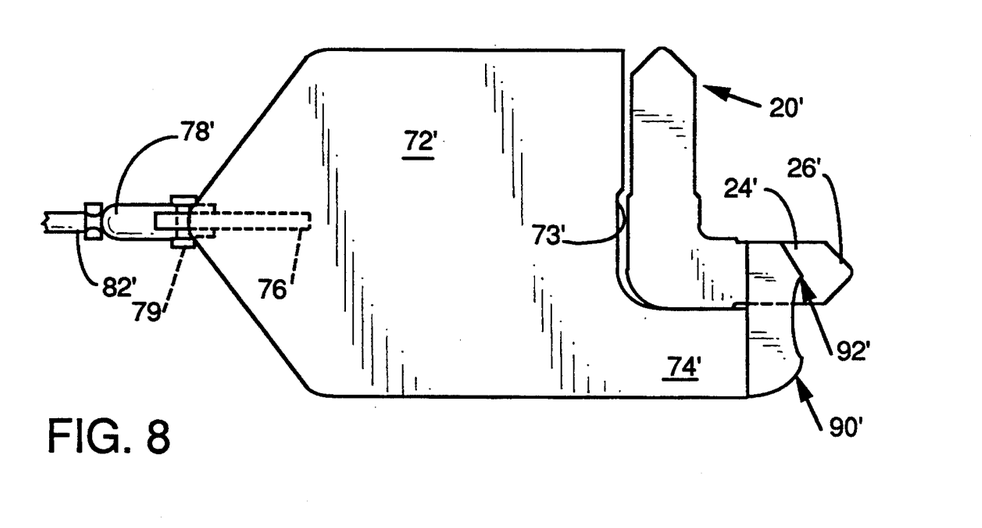
FIG. 8 is a bottom view of the drive plate of a left corner positioning unit and a left L-shaped corner member.
Figure 9:
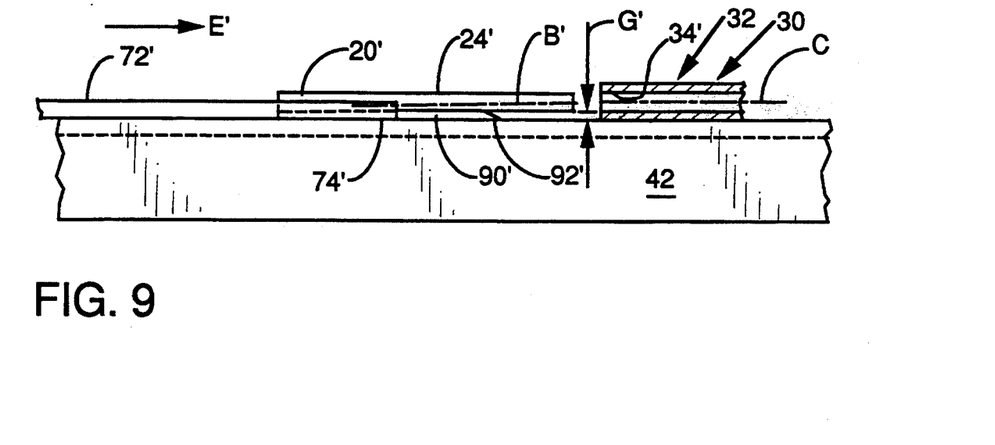
FIG. 9 is a partial side elevational view of the base member and the drive plate of a left corner positioning unit that illustrates the registration and insertion of a leg of a left corner member into the channel of a flange member shown in partial cross-section.

Referring now to FIGS. 8 and 9, it can be seen that a movable registration member 90' is attached to the front end 74' of the driver plate 72'. Preferably, movable registration member 90' has a tapered front portion 92' and is shaped as illustrated in FIGS. 8 and 9. Those of ordinary skill in the art will appreciate, however, that the movable registration member 90' may be provided in a variety of other shapes and sizes. As can be seen in FIG. 9, movable registration member 90' serves to raise the end 26' of the leg 24' of a corresponding corner member 20' a predetermined distance "G'" above the base member 42 such that the insertion axis "B'" is substantially vertically aligned with the insertion axis "C'" of the channel 34 extending through the flange member 30. It will be appreciated that the tapered front edge 92' of the movable registration member 90' serves to slide under the left end of the flange member as the leg 24' of the corner member 20' is inserted into the channel 34.

Figure 10:
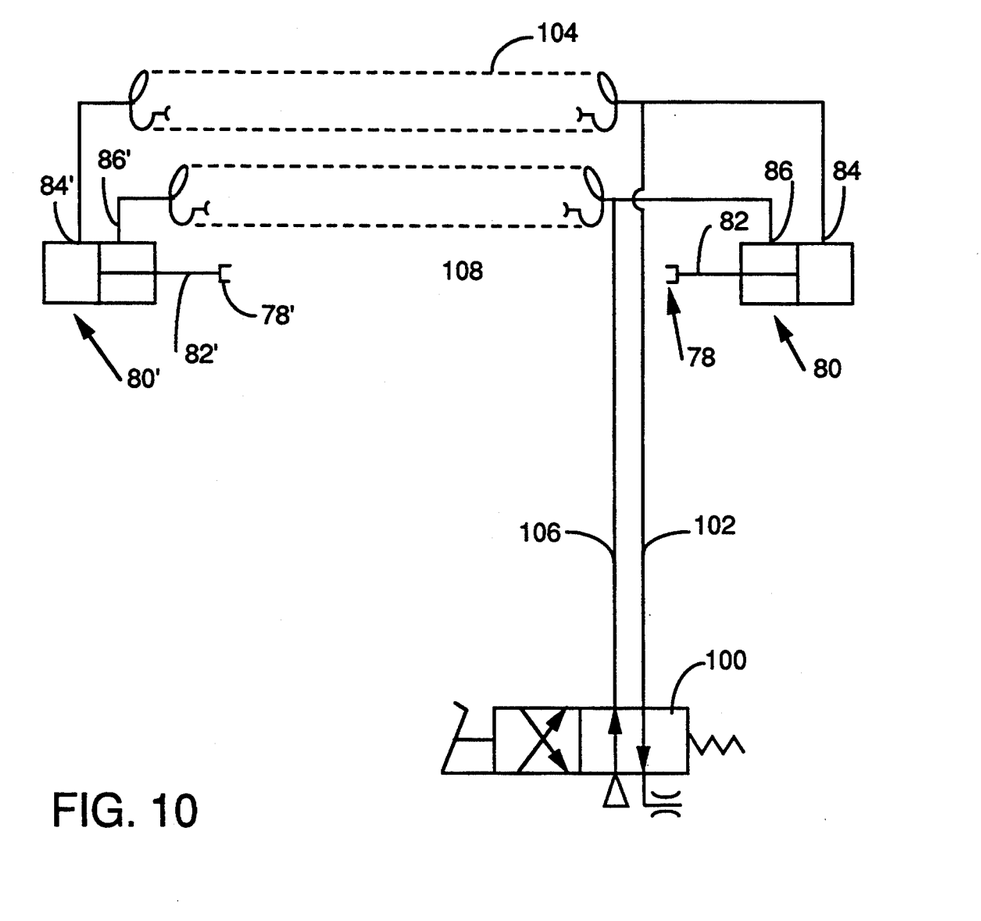
FIG. 10 is a schematic view of a preferred air system for controlling the air cylinders of the present invention.

The operation of cylinders 80, 80' can be understood from reference to FIG. 10. In a preferred embodiment, cylinders (80, 80') are pneumatically powered. However, the skilled artisan will readily appreciate that cylinders (80, 80') may also be hydraulically powered. It will be further appreciated that driver plates (72, 72') can be actuated by a variety of other known actuation means such as motor driven cam arrangements, rack and pinion gear arrangements, etc., without departing from the spirit and scope of the subject invention. As can be seen from FIG. 10, a four-way valve 100 that is attached to a source of compressed air (not shown) is used to control the actuation of cylinders (80, 80'). In a preferred embodiment, valve 100 comprises a four-way foot-actuated valve that is manufactured by Norgren Industries under the model No. K71DA00-K56-KFO; however, a myriad of other valves may be used. An air line 102 is attached to port 84 on cylinder 80 for supplying insertion air thereto. Air line 102 also supplies insertion air to cylinder 80' by means of a flexible air line section 104 that is connected to air line 102 and port 84' of air cylinder 80'. Similarly, retraction air is supplied to cylinder 80 by an air line 106 that supplies air from valve 100 to port 86 on cylinder 80. Airline 106 also supplies retraction air to cylinder 80' by a flexible airline 108 that is attached to airline 106 and port 86' on cylinder 80. It will be understood that such arrangement permits the simultaneous actuation of cylinders (80, 80'). After the legs (24, 24') of the corner members (20, 20') have been inserted into the channel 34, valve 100 causes retraction air to be supplied to cylinders (80, 80') thereby causing pistons (82, 82') to be simultaneously retracted. The skilled artisan will appreciate that the above-described air system represents one of many ways in which cylinders (80, 80') may be controlled. In particular, cylinders (80, 80') may be controlled by discrete air systems such that they do not operate simultaneously.

In a preferred embodiment, cylinders (80, 80') each have adjustable strokes so that the distance that the legs (24, 24') are inserted into the channel 34 may be varied. While cylinders having a 5" adjustable stroke have been found to work well in this application, cylinders having other adjustable and non-adjustable strokes may also be used.

The operation of the present invention can be best understood from reference to FIGS. 5 and 6. Before the assembly process is started, a plurality of right corners 20 and a plurality of left corners 20' are placed in their respective corner receiving cavities (60, 60') in the positioning units (50, 50'), respectively. A flange member 30 is placed on the base 42 member in a receiving position wherein its upstanding leg-receiving portion 32 is received on the base member 42. The right end of the flange member 30 is abutted against end plate 64. Thereafter, the removable pin 61 is removed from bores 63' and 48 and the left corner positioning unit 50' is slidably moved in a direction toward the right corner positioning unit 50 until the left end of the flange member 30 abuts or nearly abuts end plate 64' and a bore 63' aligns with a bore 48 in the base member 42. The pin 61 is then inserted through the aligned bores 63' and 48 to retain the left corner positioning unit 50' in position.

The end 33 of the upstanding leg-receiving portion 32 of the flange member 30 is then abutted against orientation surfaces (59, 59') and held in that "receiving" position while valve 100 is actuated by the operator's foot. It will be appreciated that prior to actuation, driver plates (72, 72') are in a retracted position wherein a corner member (20, 20') may be received in a ready position as shown in FIGS. 6 and 8. When valve 100 is actuated, pistons (82, 82') are extended to thus cause the driver plates (72, 72') to move in the directions depicted by arrows ("E", "E'"), respectively, thereby causing the legs (24, 24') to be inserted into the corresponding ends of channel 34. Thereafter, in the manner described above, valve 100 causes the pistons (82, 82') to be retracted, thus moving the driver plates (72 72') in the ("F", "F'") directions, respectively, to their original starting positions wherein the next consecutive corners (20, 20') are permitted to drop under the force of gravity into their respective ready positions as shown in FIGS. 6 and 8.

Figure 11:
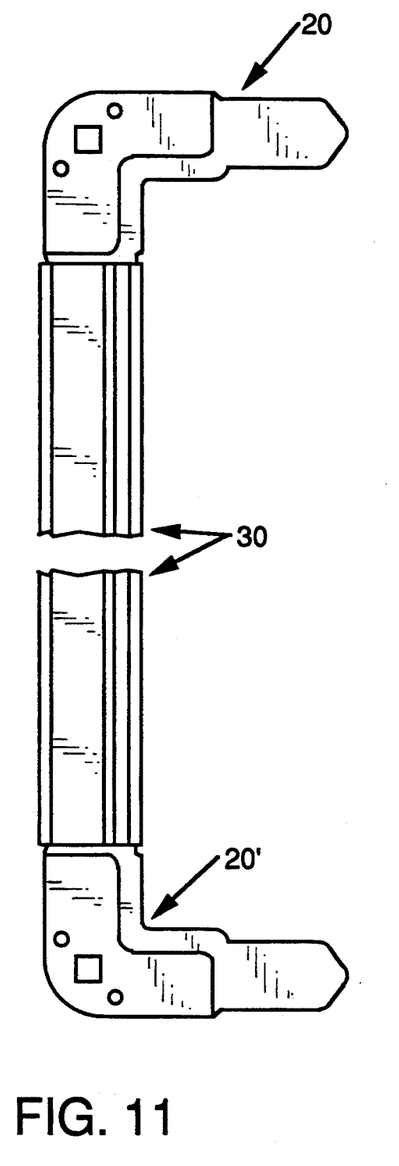
FIG. 11 is a plan view of a flange/corner assembly that has been assembled by a preferred embodiment of the present invention.

The resulting flange/corner piece assembly, generally designed as 120, is depicted in FIG. 11. After the above-described assembly process is completed, the flange/corner assembly 120 is removed from the base 42 and another flange member 30 is placed in the receiving position and the entire process is repeated. After two flange/corner piece assemblies 120 have been assembled, they can then be manually connected to two side flange members 30 to complete a rectangular flange assembly 10.

Accordingly, the present invention provides a safer and more efficient manner for inserting the legs of L-shaped corner members into the channel of a corresponding flange member used in an assembly for connecting the adjacent ends of sheet metal ducts. It will be understood, however, that various changes in the details, materials and arrangements of parts which have been herein described and illustrated in order to explain the nature of the invention may be made by those skilled in the art within the principle and scope of the invention as expressed in the appended claims.

What is claimed is:

1. Apparatus for inserting a leg having a first insertion axis of an L-shaped corner member into the channel of an elongated flange member having a second insertion axis to form an assembly for connecting the adjacent ends of rectangular sheet metal ducts comprising:

a base member for supporting said flange member in a receiving position;

means attached to said base member for positioning said L-shaped corner member in an insertion position wherein a leg of said L-shaped corner member is in confronting relationship with an end of said flange member and wherein said first insertion axis of said leg is substantially coaxially aligned with said second insertion axis of said flange member; and means attached to said base member for axially inserting said leg of said L-shaped corner member into said channel of said flange member a predetermined distance.

2. The apparatus of claim 1 wherein said positioning means further comprises means for storing a plurality of said L-shaped corner members such that after a leg of an L-shaped corner member is inserted into the channel of a flange member, another L-shaped corner member is moved to said insertion position such that a leg thereof may be inserted into the channel of another flange member.

3. The apparatus of claim 1 wherein said positioning means further comprises registration means attached to said base member for raising said leg of said L-shaped corner member a predetermined distance above said base member to permit said leg to be inserted into said channel of said flange member.

4. The apparatus of claim 1 wherein said insertion means comprises a cylinder having a selectively extendable and retractable piston adapted to selectively engage said L-shaped corner member to cause said leg thereof to be inserted into said channel of said flange member a predetermined distance.

5. The apparatus of claim 4 further comprising a driving member attached to the end of said selectively extendable and retractable piston, said driving member being sized to engage a portion of said L-shaped corner member and cause said leg thereof to be inserted into said channel of said flange member a predetermined distance when said extendable and retractable piston is extended.

6. The apparatus of claim 4 wherein said cylinder is pneumatically powered.

7. The apparatus of claim 4 wherein said cylinder is hydraulically powered.

8. Apparatus for connecting first and second L-shaped corner members to an elongated flange member having first and second ends and an elongated channel extending therethrough that is used in an assembly for connecting the adjacent ends of rectangular sheet metal ducts comprising:

a base member for supporting the flange member in a receiving position;

first means attached to said base member for positioning a first leg of said first L-shaped corner member in a first insertion position wherein said first leg is in confronting relationship with said first end of said flange member;

second means attached to said base member for positioning a second leg of said second L-shaped corner member in a second insertion position wherein said second leg is in confronting relationship with said second end of said flange member;

first means attached to said base member for inserting said first leg of the first L-shaped corner member into a first end of said channel extending through said flange member a first predetermined distance; and second means attached to said base member for inserting said second leg of said second L-shaped corner member into a second end of said channel extending through said flange member a second predetermined distance.

9. The apparatus of claim 8 wherein said first positioning means further comprises first means for storing a plurality of said first L-shaped corner members therein such that after the first leg of one said first L-shaped corner member is inserted into said first end of the channel extending through said flange member, another said first L-shaped corner member is moved to said first insertion position to enable the first leg thereof to be inserted into the first end of the channel extending through another said flange member and wherein said second positioning means further comprises second means for storing a plurality of second L-shaped corner members therein such that after said second leg of one said second member is inserted into the second end of said channel extending through said flange member, another said second L-shaped corner member is moved to said second insertion position to enable the second leg thereof to be inserted into the second end of the channel extending through another said flange member.

10. The apparatus of claim 8 wherein said first positioning means is rigidly connected to said base member and said second positioning means is movably attached to said base member to enable the distance between said first and second positioning means to be selectively adjusted to enable varying lengths of said flange members to be positioned therebetween.

11. The apparatus of claim 8 wherein said first positioning means further comprises first registration means attached to said base member for raising said first leg of said first L-shaped corner member a first predetermined distance above said base member to permit said first leg to be inserted into said first end of said channel extending through said flange member and wherein said second positioning means further comprises second registration means attached to said base member for raising the second leg of said second L-shaped corner member a second predetermined distance above said base member to permit said second leg to be inserted into said second end of said channel extending through said flange member.

12. The apparatus of claim 8 wherein said first insertion means comprises a first cylinder having a first selectively extendable and retractable piston adapted to selectively engage said first L-shaped corner member to cause said first leg thereof to be inserted into a first end of said channel extending through said flange member and wherein said second insertion means comprises a second cylinder having a second selectively extendable and retractable piston adapted to selectively engage the second L-shaped corner member to cause the second leg thereof to be inserted into a second end of said channel member extending through said flange member.

13. The apparatus of claim 12 further comprising:

a first driving member attached to the end of said first selectively extendable and retractable piston, said first driving member being sized to engage a portion of said first L-shaped corner member and cause said first leg thereof to be inserted into said first end of said channel extending through said flange member a first predetermined distance when said first extendable and retractable piston is extended; and a second driving member attached to the end of said second selectively extendable and retractable piston, said second driving member being sized to engage a portion of said second L-shaped corner member and cause a second leg thereof to be inserted into said second end of said channel extending through said flange member a second predetermined distance when said second extendable and retractable piston is extended.

14. The apparatus of claim 13 further comprising first registration means attached to said base member for raising the first leg of said first L-shaped corner member a first predetermined distance above said base member to permit said first leg to be inserted into said first end of said channel extending through said flange member and wherein said second positioning means further comprises second registration means attached to said second driving member for raising the second leg of said second L-shaped corner member a second predetermined distance above said base member to permit said second extended leg to be inserted into a second end of said channel extending through said flange member.

15. Apparatus for inserting a leg of an L-shaped corner member into the channel of an elongated flange member used in an assembly for connecting the adjacent ends of rectangular sheet metal ducts comprising:

a base member for supporting said flange member in a receiving position;

means attached to said base member for positioning said L-shaped corner member in an insertion position wherein a leg of said L-shaped corner member is in confronting relationship with an end of said flange member;

a cylinder having a selectively extendable and retractable piston adapted to selectively engage said L-shaped corner member to cause said leg thereof to be inserted into said channel of said flange member a predetermined distance; and registration means attached to said driving member, said registration means adapted to raise said leg of said L-shaped corner member a predetermined distance above said base member to permit said leg to be inserted into said channel of said flange member.

* * * * *